Patented May 16, 1933

1,909,788

UNITED STATES PATENT OFFICE

OSKAR PANTKE, OF COLLEGE POINT, NEW YORK, ASSIGNOR, BY MESNE ASSIGNMENTS, TO CATALIN CORPORATION OF AMERICA, OF FORDS, NEW JERSEY, A CORPORATION OF DELAWARE

IMITATION IVORY AND PROCESS OF MAKING SAME

No Drawing.   Application filed August 28, 1930.   Serial No. 478,545.

The present invention relates to imitation ivory and more particularly to imitation ivory constituted of a phenol-formaldehyde condensation product and to a process of producing the same.

It is well known that the supply of natural ivory is limited and is becoming scarcer as time goes on. Furthermore, natural ivory is very costly and has to be handled with great care to prevent its becoming cracked, fractured or broken. In shipping the ivory if sudden or great temperatures changes occur, the ivory deteriorates and has a tendency to crack. It is only from the uncracked portions of ivory that articles can be made. Even when the articles are made from sound natural ivory great care has to be taken in handling or using them, otherwise they are liable to crack. For example, high class billiard balls have to be maintained in thermostatically heated cabinets in order to prevent temperature changes from affecting or deteriorating the ivory balls. Then again, the use for natural ivory has increased so that the demand exceeds the supply. Various attempts have been made to replace natural ivory with artificial products of one sort or another. None of these attempts, as far as I am aware, have been satisfactory and successful in practical use.

It is an object of my invention to provide an artificial material resembling ivory which is constituted of a phenol-formaldehyde condensation product.

It is a further object of the invention to provide a practical process for making a phenol-formaldehyde condensation product which has an ivory color and which is stable, and which is not subject to deterioration in the same manner as natural ivory.

It is a further object of the invention to provide a synthetic resin having an ivory color which is relatively elastic and which is capable of relatively easy machining and the like.

Other objects and advantages of the invention will become apparent from the following description.

The invention will be readily understood by those skilled in the art from the illustrative examples. It is to be noted, however, that these examples are not to be taken as limitations on the invention which is to be construed in the light of the appended claims.

Example I

About 1 part of U. S. P. phenol is mixed with about 2 parts 40% U. S. P. aqueous formaldehyde solution. A relatively strong fixed alkaline catalyst such as C. P. sodium hydroxide is added to the phenol-formaldehyde mixture to the extent of about 0.033 parts. This mixture is heated for a period extending to about 2 to 3, 3½ or 4 hours at a temperature below the boiling point of water (100° C.) and preferably lying within a range of about 60° C. to 70° C., 75° C. or about 80° C.

After the termination of the heating period a vacuum of about 730 millimeters is applied to the resinous mass. The temperature of the resinous mass falls and this fall in temperature is compensated by the addition of heat preferably in the form of indirect steam heat. The application of heat and vacuum is continued until the temperature returns to the original temperature lying within the range between about 60° C. to 70° C., 75° C., or about 80° C.

After the termination of the aforesaid operations about 0.075 parts of technical lactic acid is added to neutralize the caustic soda. After the caustic soda is substantially neutralized about 0.15 parts of glycerine are added. Heating is continued in the presence of a vacuum as aforesaid until the resinous mass is dehydrated. A very convenient test for dehydration is to take a small amount of resin and drop it into a beaker of water at about 11° C. to about 13° C., say about 12° C. If the resin sets to a globule or ball which yields slightly when pressed between the first finger and thumb then the resin is finished.

Upon dehydration of the resinous mass the latter can be cast into open molds for curing or vulcanizing. The latter operation is preferably conducted in a heated chamber which is maintained at a temperature below the boiling point of water (100° C.) and preferably at a temperature not higher than about 76° C. to about 82° C., say about 80° C. This vulcanizing is continued until the resinous mass sets or hardens. Usually about 100 or 150 to about 200 hrs. are sufficient for practically complete hardening of the resinous mass. Upon the expiration of this period a resin having a pale buff color which closely resembles the color of ivory is obtained.

Example II

In the present instance, the same process as described in connection with Example I is followed except that the proportions and reacting materials are as follows:

| | Parts |
|---|---|
| U. S. P. phenol | 1.0 |
| U. S. P. 30% aqueous formaldehyde solution | 2.5 |
| C. P. potassium hydroxide | 0.035 |
| Technical lactic acid | 0.068 |
| U. S. P. or C. P. glycerine | 0.150 |

The imitation ivory produced in the foregoing manner has the following properties:

Specific gravity_____ 1.276 (1.273 to 1.279) (approximately)
Ash _____ 0.40% (0.30 to 0.45%) (approximately)
Tensile strength_____ 6500 to 7500 lbs. per sq. inch (approximately)
Compressive strength_ 1500 (14,500 to 16,500) lbs. per sq. inch (approximately)
Rockwell hardness_____ B-64 (B63 to B66) (approximately)

The specific gravity of the resin may be as those skilled in the art will readily understand. For example, the greater the water content, the lower the specific gravity and conversely, the lower the water content, the higher the specific gravity. By varying the water content, resins may be produced having a lower and a higher specific gravity than the figures set forth hereinabove. Then again, the amount of glycerine present in the resin changes the specific gravity thereof. Furthermore, by varying the degree of heat used in the vulcanization the specific gravity of the resin may likewise be varied. For instance, resin may be produced having a specific gravity as low as approximately 1.25 and as high as approximately 1.38.

The ash content of the resin is preferably maintained as low as possible and is usually dependent upon the purity of the chemicals employed.

The strength of the resin may be varied within relatively wide limits. Generally speaking, by over-vulcanizing or under-vulcanizing the strength is lowered and by vulcanizing carefully the strength may be increased. By taking care to have the resin free from imperfections, air bubbles and blow holes, a stronger resin may be produced. Furthermore, the more solids including dyestuffs, fillers and the like when incorporated in the resin tends to decrease the strength of the resin.

The hardness of the resin may be varied by the curing or vulcanizing operation and/or the extent to which the resin has polymerized. It may be broadly stated that the more complete the polymerization or vulcanization, the harder the resin. Moreover, the glycerine content influences hardness and, usually, the less glycerine the harder the resin. It will be observed that the resin is fire retardant and is inert to certain oils and reagents. Furthermore, the resin is relatively elastic and is relatively non-brittle and can be worked and fabricated by the use of the methods usually employed when working with wood or the like.

It will be noted that the present invention provides a low temperature process for the production of synthetic resin of the phenol-formaldehyde condensation type at relatively low temperatures. By low temperatures is meant temperatures lower than 100° C. which is in sharp contrast to prior processes which must be conducted at or above the boiling point of water or 100° C. at atmospheric pressure. Generally speaking, the lower the temperature employed in the present process the longer the time it takes to produce the resin. For instance, if a temperature of about 50° C. were employed then a longer time would be necessary to heat the mass than has been described in connection with the temperatures given. If a higher temperature is used than the one specified, then heating period would be shortened but the resin would have a tendency to become darkened. By the present process a resin is produced which has a whitish (an extremely light) color resembling marble.

It will be also observed that my invention provides an improved phenol-formaldehyde resin of the artistic and beautiful type which is capable of easy fabrication. For instance, a rod of the present resin can be turned on a lathe and the cut material is turned off in the form of a long ribbon quite similar to a wood shaving. Prior resins do not generally have this property and tend to cut off in small chips or pieces when turned on a lathe. The instant characteristic is very useful in identifying the improved resin set forth herein. When shavings of the present resin are heated at 99° C. in an electric oven for a period of time sufficient to bring them to constant weight, say about 20 hours, there is a practically constant loss which varies from about 9.5 to about 10.2 of the weight of the resin. Another good test for identifying the present resin is to subject a rod of the resin to an impact blow, as for instance, when a rod of resin is grasped in the hand and the free end of the rod is struck against a fixed object. With resins of the present type, they will absorb considerable shock whereas other resins of the same class will tend to break and fracture. Then again if a rod of the instant resin is dropped on either a concrete or hard floor it will bounce back without breaking. Other known resins are rather dead and do not bounce very much and generally have a tendency to crack when dropped. Furthermore, a small rod constituted of the present resin say ½″ in diameter, when immersed in hot water can be bent quite readily without breaking. Other resins are less flexible and will tend to break when subjected to this test.

It is further to be noted that the present process produces a resin which is tougher and stronger than known resins. For instance, the present resin generally has a higher tensile strength and elasticity than similar resins. In addition, the instant resin is less brittle than prior resins. In fact, my resin is relatively non-brittle as compared with old resins of the type described herein, particularly in regard to workability, and in the claims the phrase "relatively non-brittle" will be used to characterize this distinguishing feature of my synthetic ivory resin.

Moreover, the present process produces a phenol-formaldehyde resin which when in its liquid state prior to hardening has a hydrogenion content corresponding to a pH value of about 4.00 to about 5.00 as determined by a potentiometer of the Leeds and Northrup type. Prior resins have different pH values and the aforesaid pH value for liquid resin made in accordance with the process described herein is another good way of identifying the present improved resin.

It is to be observed that the present invention uses technical lactic acid. This acid may be obtained on the open market and is produced by a fermentation method as is well known by those skilled in the art. Thus, The Condensed Chemical Dictionary (published by the Chemical Catalog Company, 1930, 2nd Edition) makes the following statement on page 271 in regard to the derivation of lactic acid. The Dictionary states that: "By fermenting starch, corn, potatoes, milk, grape sugar solutions, etc., the best-known process being that called the "Avery" process, and neutralizing the acid as soon as formed, with calcium carbonate. The solution of calcium lactate is concentrated and decomposed with sulfuric acid." The technical acid is a yellow, thick liquid.

It is to be observed that the present invention produces a different type of resin from the resins produced in applicant's copending applications Serial Nos. 478,543; 478,544 and 478,546. The application bearing Serial No. 478,543 deals with a translucent resin and applications Nos. 478,544 and 478,546 deal with a clear transparent resin and a resin resembling marble respectively. On the other hand, the resin of the present application is opaque and resembles natural ivory. In the present process technical lactic acid is used whereas in none of the other processes is this acid employed.

It is to be observed that the present invention provides a process for producing a low temperature phenol-formaldehyde synthetic resin made by reacting phenol and formaldehyde in the proportion of about 1 part by weight of the former to about 0.8 parts by weight of the latter. The amount of formaldehyde used depends upon the final product and the form of raw material. In other words, when formaldehyde is used as a 30% or as a 40% aqueous formaldehyde solution, about 2 parts of the latter or about 2.5 parts of the former are used. The phenol-formaldehyde mass contains a fixed alkali catalyst which is present to an extent of about 0.033 to 0.035 parts by weight. Of course, when the fixed alkali catalyst, such as caustic soda of caustic potash, is used in the form of a solution an increased amount of solution will have to be used depending upon the dilution or concentration of the solution as those skilled in the art will readily understand. Subsequently, the fixed alkali catalyst is neutralized by the addition of about 0.068 to about 0.075 parts by weight of technical lactic acid. If the acid is used in the form of a solution, the amount must be increased depending upon the dilution or concentration of the solution. During the process or prior to final heating, about 0.15 or so parts by weight of glycerine are added. Variations and modifications of the specific proportions herein given are within the purview of the present specification and claims as those skilled in the art will understand.

Although I have set forth herein specific temperatures, concentrations, period of time, specific substances and specific operations, it will be observed that variations may be resorted to without departing from the spirit of the invention as defined in the appended claims.

I claim:

1. The process of producing imitation ivory which comprises mixing phenol and aqueous formaldehyde in the proportion of about 1 part by weight of phenol to about 2 parts of 40% to 2.5 parts of 30% by weight of the aqueous formaldehyde, adding about 0.033 to 0.035 parts of c. p. fixed alkali hydroxide, heating said mixture without boiling the same at a temperature of about 60° C. to about 80° C. for a period of about 2 to about 4 hours to cause a reaction and formation of a resinous mass under non-reflux conditions, applying a vacuum to effect evaporation of water from said mass, continuing the application of heat to maintain the temperature of said mass, adding about 0.068 parts to about 0.075 parts by weight of technical lactic acid, continuing the application of said vacuum and the aforesaid low heat to effect dehydration of the resinous mass, adding glycerine to said mass prior to final heating, discontinuing said heating and said vacuum when a sample of the resinous mass upon being dropped in water having a temperature of about 11° C. to about 13° C. congeals to a globule having just sufficient hardness to yield slightly when squeezed between the fingers, then pouring the resinous mass into molds, and subjecting said molds to low heat at a temperature of about 82° C. or below for a period up to about 200 hours to harden and solidify the said resinous mass into a mass resembling natural ivory.

2. The process of producing imitation ivory which comprises mixing phenol and 40% of aqueous formaldehyde in the proportion of about 1 part by weight of phenol to about 2 parts by weight of about a 40% aqueous formaldehyde, adding about 0.033 parts by weight of c. p. sodium hydroxide, heating said mixture without boiling the same at a temperature of about 60° C. to about 80° C. for a period of 2 to about 4 hours to cause reaction of the aforesaid mixture and the formation of a resinous mass under non-reflux conditions, applying a vacuum to effect evaporation of water from said mass, the said evaporation causing the temperature of the mass to fall, continuing the application of said vacuum and said low heat until the temperature of said mass rises to a temperature of about 60° C. to about 80° C., adding about 0.075 parts by weight of technical lactic acid to the resinous mass, adding glycerine to said mass, continuing the application of said vacuum and said low heat until a sample of the resinous mass congeals when dropped in cold water having a temperature of about 11° C. to about 13° C. to a globule having just sufficient hardness to yield slightly when squeezed between the fingers, then pouring the resinous mass into molds, and subjecting said molds to low heat at a temperature of about 76° C. to about 82° C. for a period up to about 200 hours to harden and solidify the said resinous mass into a mass resembling natural ivory.

3. An imitation ivory constituted of a low temperature phenol-formaldehyde resin made by mixing phenol and aqueous formaldehyde in the proportion of about 1 part by weight of phenol to about 2 parts of 40% to 2.5 parts of 30% by weight of the aqueous formaldehyde, adding about 0.033 to 0.035 by weight of c. p. fixed alkali hydroxide, heating said mixture without boiling the same at a temperature of about 60° C. to about 80° C. for a period of about 2 to about 4 hours to cause a reaction and formation of a resinous mass under non-reflux conditions, applying vacuum to effect evaporation of water from said mass, continuing the application of heat to maintain the temperature of said mass, adding about 0.068 parts to about 0.075 parts by weight of technical lactic acid, continuing the application of said vacuum and said heat to effect dehydration of the resinous mass, adding glycerine to said mass prior to final heating, discontinuing said heat and said vacuum when a sample of the resinous mass upon being dropped in water having a temperature of about 11° C. to about 13° C. congeals to a globule having just sufficient hardness to yield slightly when squeezed between the fingers, then pouring the resinous mass into molds, and subjecting the resinous mass in said molds to low heat at a temperature of substantially lower than 100° C. for a period up to about 200 hours to harden and solidify the said resinous mass into a mass resembling natural ivory.

4. An imitation ivory constituted of a low temperature phenol-formaldehyde resin made by mixing phenol and 40% of aqueous formaldehyde in the proportion of about 1 part by weight of phenol to about 2 parts by weight of the aqueous formaldehyde, adding about 0.033 parts by weight of c. p. sodium hydroxide, heating said mixture without boiling the same at a temperature of about 60° C. to about 80° C. for a period of 2 to about 4 hours to cause reaction of the aforesaid mixture and the formation of a resinous mass under non-reflux conditions, applying a vacuum to effect evaporation of water from said mass, the said evaporation causing the temperature of the mass to fall, continuing the application of said vacuum and said heat until the temperature of said mass raises to a temperature of about 60° C. to about 80° C., adding about 0.075 parts by weight of technical lactic acid to the resinous mass, adding glycerine to said mass prior to final heating, continuing the application of said vacuum and said low heat until a sample of the resinous mass congeals when dropped in cold water to a globule having just sufficient hardness to yield slightly when squeezed between the fingers, then pouring the resinous mass into molds, and subjecting said molds to low heat at a temperature for a period up to about 200 hours to harden and solidify the said resinous mass into a mass resembling natural ivory.

5. An imitation ivory constituted of a low temperature phenol-formaldehyde resin made by mixing phenol and 40% of aqueous formaldehyde in the proportion of about 1 part by weight of phenol to about 2 parts by weight of the aqueous formaldehyde, adding about 0.033 parts by weight of c. p. sodium hydroxide, heating said mixture without boiling the same at a temperature of about 60° C. to about 80° C. for a period of 2 to about 4 hours to cause reaction of the aforesaid mixture and the formation of a resinous mass under non-reflux conditions, applying a vacuum to effect evaporation of water from said mass, the said evaporation causing the temperature of the mass to fall, continuing the application of said vacuum and said heat until the temperature of said mass raises to a temperature of about 60° C. to about 80° C., adding about 0.075 parts by weight of technical lactic acid to the resinous mass, adding glycerine to said mass prior to final heating, continuing the application of said vacuum and said low heat until a sample of the resinous mass congeals when dropped in cold water having a temperature of about 11° C. to about 13° C. to a globule having just sufficient hardness to yield slightly when squeezed between the fingers, then pouring the resinous mass into molds, and subjecting said molds to low heat at a temperature of about 76° C. to about 82° C. for a period up to about 200 hours to harden and solidify the said resinous mass into a mass resembling natural ivory.

6. The process of producing a low temperature phenol-formaldehyde resin resembling natural ivory which comprises reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding technical lactic acid to substantially neutralize said alkali catalyst, continuing the application of said heat substantially below 100° C. and said vacuum to effect dehydration of the resinous mass, adding glycerine to the same during the aforesaid operations, then pouring the resinous mass into molds and subjecting said molds to heat at a temperature substantially below 100° C. to harden and solidify the said resinous mass.

7. The process of producing a low temperature phenol-formaldehyde resin resembling natural ivory which comprises reacting phenol and a substance yielding formaldehyde in the proportion of about 1.00 part by weight of phenol to about 0.8 part by weight of formaldehyde in the presence of a fixed alkali catalyst, heating the said phenol-formaldehyde mass without boiling the same at a low heat substantially under 100° C. for a period of about 2 to about 4 hours under non-reflux conditions to form a resinous mass, applying a vacuum to said resinous mass after the termination of said period whereby water is evaporated and the temperature of the resinous mass tends to fall, continuing heating said resinous mass substantially under 100° C. to counteract the tendency of the temperature to fall, adding technical lactic acid to neutralize the alkali catalyst, continuing the application of said heat and vacuum, adding glycerine to said resinous mass prior to final heating, continuing the application of said vacuum and said heat, pouring said mass into molds, and subjecting the mass in said molds to a low heat at a temperature substantially under about 100° C. to harden said resinous mass.

8. The process of producing a low temperature phenol-formaldehyde resin resembling natural ivory which comprises reacting phenol and a substance yielding formaldehyde in the proportion of about 1.00 part by weight of phenol to about 0.8 parts by weight of formaldehyde in the presence of a fixed alkali catalyst, heating the said phenol-formaldehyde mass without boiling the same at a low heat substantially under 100° C, under non-reflux conditions to form a resinous mass, applying a vacuum to said resinous mass whereby water is evaporated and the temperature of the resinous mass tends to fall, continuing heating said resinous mass substantially under 100° C. applying a vacuum to said resinous mass, adding technical lactic acid to neutralize the alkali catalyst, continuing the application of said heat and said vacuum, adding glycerine to said resinous mass prior to final heating, continuing the application of said vacuum and said heat, pouring said mass into molds, and subjecting the mass in said molds to a low heat at a temperature substantially under about 100° C. to harden said resinous mass.

9. The process of producing a low temperature phenol-formaldehyde resin resembling natural ivory which comprises reacting a mass of phenol and a substance yielding formaldehyde in the presence of a fixed alkali catalyst, heating the said phenol-formaldehyde mass without boiling the same at low heat substantially under 100° C. for a period of about 2 to about 4 hours under non-reflux conditions, applying a vacuum to the said mass after the termination of said period, whereby water is evaporated and the temperature of mass tends to fall, continuing heating said mass substantially under 100° C. to counteract the tendency of temperature to fall, adding technical lactic acid to substantially neutralize said alkali catalyst, continuing the application of said low heat and vacuum, adding glycerine to the mass prior to final heating, continuing the application of said heat and said vacuum, pouring the liquid resin into molds, and subjecting said molds to a low heat at a temperature substantially under 100° C. to harden the said resin.

10. The process of producing a low temperature phenol-formaldehyde resin resembling natural ivory which comprises reacting a mass of about 1.00 part by weight of phenol and about 0.8 parts by weight of a substance yielding formaldehyde in the presence of a fixed alkali catalyst, heating the said phenol-formaldehyde mass without boiling the same at low heat substantially under 100° C. for a period of about 2 to about 4 hours under non-reflux conditions, applying a vacuum to the said mass, whereby water is evaporated and the temperature of mass tends to fall, continuing heating said mass substantially under 100° C. to counteract the tendency of temperature to fall, adding technical lactic acid to substantially neutralize said alkali catalyst, continuing the application of said low heat and vacuum, adding glycerine to the mass, continuing the application of said heat and said vacuum, pouring the liquid resin into molds, and subjecting said molds to a low heat at a temperature substantially under 100° C. to harden the said resin.

11. The process of producing a low temperature phenol-formaldehyde resin resembling natural ivory which comprises reacting about 1.00 part by weight of U. S. P. phenol with about 2.0 parts of 40% to about 2.5 parts of 30% by weight of U. S. P. aqueous formaldehyde in the presence of about 0.033 to about 0.035 parts by weight of a fixed alkali catalyst, heating said mass without boiling the same at a temperature of about 60° C. to about 80° C. for a period of about 2 to about 4 hours under non-reflux conditions to form a resinous mass, adding about 0.068 parts by weight to about 0.75 parts by weight of technical lactic acid, applying a vacuum and said heat to effect the evaporation of water, the temperature of the mass tending to fall to a temperature of about 35° C. to about 40° C., adding about 0.15 parts c. p. glycerine to said mass prior to final heating, continuing the application of said heat, pouring the resinous mass into molds, and subjecting the resinous mass in said molds to a low heat of a temperature of about 76° C. to about 82° C. up to about 200 hours to harden said reinous mass.

12. The process of producing a low temperature phenol-formaldehyde resin resembling natural ivory which comprises reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding technical lactic acid to substantially neutralize said alkali catalyst, continuing the application of said heat substantially below 100° C. and said vacuum to effect dehydration of the liquid resinous mass, and adding glycerine to the same during the aforesaid operations.

13. A solid low temperature phenol-formaldehyde synthetic resin resembling natural ivory and made by reacting phenol and a substance yielding formaldehyde in the proportion of about 1.25 parts by weight of phenol to about 1.00 part by weight of formaldehyde in the presence of a fixed alkali catalyst, heating the said phenol-formaldehyde mass at a low heat substantially under 100° C. for a period of about 2 to about 4 hours to form a resinous mass, applying a vacuum to said resinous mass after the termination of said period whereby water is evaporated and the temperature of the resinous mass tends to fall, continuing heating said resinous mass substantialy under 100° C. to counteract the tendency of the temperature to fall, adding technical lactic acid to substantially neutralize the alkali catalyst, continuing the application of said heat and vacuum, adding glycerine to said resinous mass, continuing the application of said vacuum and low heat until a sample of the mass when dropped into cold water congeals to a globule having just sufficient hardness to yield slightly when squeezed between the fingers, thereafter pouring said mass into molds, and subjecting said molds to a low heat at a temperature substantially under 100° C. for a period up to 200 hours to harden said resinous mass.

14. A solid low temperature synthetic resin resembling natural ivory made by reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding technical lactic acid to substantially neutralize said alkali catalyst, continuing the application of said heat substantially below 100° C. and said vacuum to effect dehydration of the resinous mass, adding glycerine to the mass during the aforesaid operations, pouring the resinous mass into molds and subjecting said molds to heat at a temperature substantially below 100° C. to harden and solidify the said resinous mass.

15. A solid low temperature synthetic resin resembling natural ivory and made by reacting phenol and a substance yielding formaldehyde in the proportion of about 1.00 part by weight of phenol to about 0.80 part by weight of formaldehyde in the presence of a fixed alkali catalyst, heating the said phenol-formaldehyde mass without boiling the same at a low heat substantially under 100° C. under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding technical lactic acid to neutralize the alkali catalyst, continuing the application of said heat and said vacuum, adding glycerine to said resinous mass prior to final heating, continuing the application of said vacuum and said heat, pouring said mass into molds, and subjecting the mass in said molds to a low heat at a temperature substantially under about 100° C to harden said resinous mass.

16. A solid low temperature synthetic resin resembling natural ivory and made by reacting a mass of phenol and a substance yielding formaldehyde in the presence of a fixed alkali catalyst, heating the said phenol-formaldehyde mass without boiling the same at low heat substantialy under 100° C. for a period of about 2 to about 4 hours under non-reflux conditions, applying a vacuum to the said mass, whereby water is evaporated and the temperature of mass tends to fall, continuing heating said mass substantially under 100° C. to counteract the tendency of temperature to fall, adding technical lactic acid to substantially neutralize said alkali catalyst, continuing the application of said heat and said vacuum, adding glycerine to the mass prior to final heating, continuing the application of said heat and said vacuum, pouring the liquid resin into molds, and subjecting said molds to a low heat at a temperature substantially under 100° C. to harden the said resin.

17. A solid low temperature synthetic resin made by reacting about 1.00 part by weight of U. S. P. phenol with about 2.0 parts of about 40% to about 2.5 parts of about 30% by weight of U. S. P. aqueous formaldehyde in the presence of about 0.033 to about 0.035 parts by weight of caustic soda, heating said mass without boiling the same at a temperature of about 60° C. to about 80° C. for a period of about 2 to about 4 hours under non-reflux conditions to form a resinous mass, adding about 0.068 parts by weight to about 0.075 parts by weight of technical lactic acid, applying a vacuum and said heat to effect the evaporation of water, the temperature of the mass tending to fall to a temperature of about 35° C. to about 40° C., adding about 0.15 parts c. p. glycerine to said mass subsequent to neutralization, continuing the application of heat to raise the temperature of said mass to a temperature of about 60° C. to about 80° C. and until a sample of the resinous mass when dropped into cold water congeals to a globule having just sufficient hardness to yield slightly when squeezed between the fingers, thereafter pouring the mass into molds, and subjecting the resinous mass in said molds to a low heat of a temperature of about 76° C. to about 82° C. up to about 200 hours to harden said resinous mass.

18. A solid low temperature phenol-formaldehyde synthetic resin produced by the process set forth in claim 6 and having the following properties:
Specific gravity approximately 1.250 to 1.380.
Tensile strength approximately 6,000 to 10,000 #/sq. in.
Compression strength approximately 10,000 to 16,000 #/sq. in.

19. A low temperature phenol-formaldehyde synthetic resin produced by the process set forth in claim 7 having a pH value of about 6.00 in its liquid state.

20. A solid low temperature phenol-formaldehyde synthetic resin produced by the process set forth in claim 8, said synthetic resin being relatively non-brittle and being capable of producing a relatively long, practically unbroken ribbon or shaving when turned on a lathe.

21. A solid low temperature phenol-formaldehyde synthetic resin produced by the process set forth in claim 8, said synthetic resin being relatively tough, strong and elastic and being capable of bending quite readily when submerged in hot water in the form of a small rod.

22. The process of producing a low temperature phenol-formaldehyde resin resembling natural ivory which comprises reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding technical lactic acid to substantially neutralize said alkali catalyst, continuing the application of said heat substantially below 100° C. and said vacuum to effect dehydration of the liquid resinous mass, adding glycerine to said resinous mass, continuing the application of said heat and said vacuum, pouring the resinous mass into molds and subjecting said molds to heat at a temperature substantially below 100° C. to harden and solidify the said resinous mass.

23. A solid low temperature synthetic resin made by reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding technical lactic acid to substantially neutralize said alkali catalyst, continuing the application of said heat substantially below 100° C. and said vacuum to effect dehydration of the resinous mass, adding glycerine to said resinous mass, continuing the application of said heat and said vacuum, pouring the resinous mass into molds and subjecting said molds to heat at a temperature substantially below 100° C. to harden and solidify the said resinous mass.

In testimony whereof, I hereunto set my hand.

OSKAR PANTKE.